(12) United States Patent
Dimou et al.

(10) Patent No.: US 9,497,681 B2
(45) Date of Patent: Nov. 15, 2016

(54) METHODS IN BASE STATIONS, BASE STATIONS, COMPUTER PROGRAMS AND COMPUTER PROGRAM PRODUCTS

(75) Inventors: Konstantinos Dimou, Stockholm (SE); Arne Simonsson, Gammelstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 269 days.

(21) Appl. No.: 14/116,198

(22) PCT Filed: May 12, 2011

(86) PCT No.: PCT/SE2011/050604
§ 371 (c)(1),
(2), (4) Date: Nov. 7, 2013

(87) PCT Pub. No.: WO2012/154100
PCT Pub. Date: Nov. 15, 2012

(65) Prior Publication Data
US 2014/0079026 A1      Mar. 20, 2014

(51) Int. Cl.
*H04W 36/20* (2009.01)
*H04W 36/04* (2009.01)

(52) U.S. Cl.
CPC ............. *H04W 36/20* (2013.01); *H04W 36/04* (2013.01)

(58) Field of Classification Search
None
See application file for complete search history.

(56) References Cited

U.S. PATENT DOCUMENTS

| 2010/0173637 A1 | 7/2010 | Damnjanovic et al. |
| 2010/0322227 A1 | 12/2010 | Luo |
| 2011/0306347 A1* | 12/2011 | Choi ............... H04W 36/04 455/438 |

(Continued)

FOREIGN PATENT DOCUMENTS

EP        2 182 751 A1      5/2010

OTHER PUBLICATIONS

LG Electronics Inc. HetNet Mobility Enhancement with Ca. 3GPP Draft; R2-113301 3rd Generation Partnership Project (3GPP). Mobile Competence Centre. 650. Route des Lucioles. Sophia-Antipolls Cedex, France vol. RAN WG2. no. Barcelona. Spain; May 9, 2011. May 3, 2011.

(Continued)

*Primary Examiner* — Mohammad Adhami

(57) ABSTRACT

A method in a first base station having a first coverage area at least partly overlapping with a second coverage area of a second base station, the first base station operating within a first transmission power range and the second base station operating within a second transmission power range. The method includes determining radio link quality of a user equipment (UE1) connected to the first base station and being located in an adjustable extended coverage range of the second base station; requesting from the second base station, interference related measurements for unused physical channels or for physical channels at least partially overlapping with physical channels used by UE1 and having the radio link quality falling below a threshold value; and deciding for UE1, based on the interference related measurements, whether a handover to the second base station should be performed.

10 Claims, 4 Drawing Sheets

(56) References Cited

U.S. PATENT DOCUMENTS

| | | | | |
|---|---|---|---|---|
| 2012/0122472 A1* | 5/2012 | Krishnamurthy | ..... | H04L 5/0053 |
| | | | | 455/456.1 |
| 2012/0178483 A1* | 7/2012 | Rosenau | ............... | H04W 28/16 |
| | | | | 455/509 |
| 2014/0029507 A1* | 1/2014 | Dimou | ............... | H04B 7/15528 |
| | | | | 370/315 |

OTHER PUBLICATIONS

NTT Docomo. PCFI CH Protection by Indicating MBSFN Subframe Configuration in Handover Command. 3GPP Draft; R2-110114 EICIC PCFICH Protection. Mobile Competence Centre. 650. Route des Lucioles. Sophia-Antipolls Cedex, France vol. RAN WG2. no. Dublin, Ireland. Jan. 11, 2011.

Huawei et al. Random Access for Handover in Co-Channel HetNet 3GPP Draft; R2-111017 Random Access Issue for Ho. Mobile Competence Centre. 650. Route des Lucioles. Sophia-Antipolls Cedex, France vol. RAN WG2. no. Taipei, Taiwan. Feb. 15, 2011.

Renesas Electronics Europe. RSRQ Measurements for Tom eiCIC. 3GPP Draft; R4-110935. 3rd Generation Partnership Project (3GPP). Mobile Competence Centre. 650. Route des Lucioles. Sophia-Antipolls Cedex, France vol. RAN WG4. no. Taipei, Taiwan. Feb. 17, 2011.

Liang, et al. Evolution of Base Stations in Cellular Networks: Denser Deployment versus Coordination. Communications, 2008. ICC '08. IEEE International Conference on Digital Object Identifier: 10.1109/ICC.2008.775. May 2008.

Cisco. Cisco Visual Networking Index: Forecast and Methodology, 2009-2014. White Paper. Jun. 2, 2010.

Ericsson. Considerations on non-CA Based Heterogeneous Deployments. 3GPP R1-101752. 3GPP TSG RAN WG1 Meeting #60bis. Beijing, China. Apr. 12-16, 2010.

* cited by examiner

METHODS IN BASE STATIONS, BASE STATIONS, COMPUTER PROGRAMS AND COMPUTER PROGRAM PRODUCTS

FIELD OF THE INVENTION

The invention relates generally to the field of handovers of user equipment between base stations.

BACKGROUND OF THE INVENTION

There is an ever increasing demand for higher data rates in cellular networks, which poses challenges to developers of such wireless networks. The existing cellular networks should preferably be evolved in a cost efficient as well as time efficient manner so as to meet the requirements for higher data rates. In this respect, a number of approaches are possible. A first option is to increase the density of existing base stations; a second option is to increase the cooperation between the base stations and a third option is to deploy smaller base stations in areas where high data rates are needed within the existing base station grid. The use of smaller base stations within the current macro base stations network is referred to as "heterogeneous networks", or multilayer network, and a layer consisting of smaller base stations is termed a "micro" or "pico" layer. The overlaying base stations are then called macro base stations.

Building a denser macro base station grid and simultaneously enhancing the cooperation between the macro base stations (i.e. first and second options above) is a solution that certainly would meet the requirements for higher data rates. However, such an approach is not necessarily a cost efficient approach, as both costs and delays associated with installation of macro base stations are significant, especially in urban areas.

The third option, i.e. deploying small base stations within the already existing macro layer grid is an appealing solution, since these smaller base stations are anticipated to be more cost efficient than macro base stations, and their deployment time will be shorter as well. However, such a dense deployment of macro and micro base stations would lead to a significantly higher amount of signaling due to frequent handovers for users moving at high speed.

The macro layer grid of the heterogeneous network could serve users moving at high speed, as well as service wider areas where the demand for high data rates is less and the grid consisting of smaller base stations in the heterogeneous network could be employed in service areas having a higher density of users requiring high data rates, or hotspots as such areas are denoted. In the heterogeneous network thus, macro base stations could be used for coverage and micro or pico base stations for capacity. This provides a semi-static or dynamic sharing of resources across macro-micro/pico layers.

One of the main targets of micro base stations, also denoted low power nodes, is to absorb as many users as possible from the macro layers. This would offload the macro layer and allow for higher data rates both in the macro and in the micro layer. In addition, users would have increased radio quality, especially in uplink, than when connected to macro base stations, since they are generally going to be closer to smaller base stations.

In this respect, mainly two techniques have been discussed within the 3GPPP:
1) extending the range of small cells by using cell specific cell selection offsets, and
2) increasing the transmission power of low power nodes and simultaneously appropriately set the uplink power control target P0 for the users connected to low power nodes.

The former method seems to attract more interest of standardization for 3GPP, mainly due to the higher flexibility that it offers. Increasing the power of low power nodes has limits related to the maximum transmission power of the low power nodes.

By applying any of the above techniques the interference in the downlink control channels increases. Since downlink control channels are transmitted over the whole bandwidth, classical inter-cell interference (ICIC) mechanisms cannot be applied to them.

This creates new interference scenario of a given cell receiving high other cell interference in the downlink control channel by a neighbor cell transmitting with higher power. The main technique which has been investigated by the 3GPP Long term evolution (LTE) standardization process is to employ "Almost Blank Sub-frames" (ABS) at the macro layer. The macro layer is muted so as to not create high other cell interference to users that are both connected to the low power nodes and are located at an extended range thereof. The coverage range of a low power node can be increased by using a cell selection offset (or handover thresholds), and this increased coverage range is denoted extended range of low power node.

ABS is a technique which does solve the problem of interference generated by the macro layer to users connected to low power nodes and located at the extended range of the low power nodes. However, a drawback of this technique is that resources are not fully used at the macro layer. Moreover, for the case in which the macro layer is heavily loaded and the number of micro layer users located at the extended range is low, a high number of macro layer users will have to underutilize their resources so as not to interfere with few micro layer users located at the extended range of the low power nodes. This is an inefficient use of radio resources and might become even more pronounced if the users connected to low power nodes and located at the extended range of small cells are having relatively good link to the macro base station and not very much uplink data to send. Hence the benefit from connecting to a base station yielding better uplink connection is not considerable, but the amount of radio resources sacrificed for this benefit is high. From the above, it is clear that it is a challenging task to balance different aspects, such as use of communication resources and minimizing interference, when optimizing the performance of the communication system. That is, underutilization of communication resources obviously affects the service that can be offered to users in a similar way the service offered to users is affected by interference. It is clear that there is room for improvements on this situation in this field of technology.

SUMMARY OF THE INVENTION

An object of the invention is to provide methods and devices for improving the use of communication resources without significantly deteriorating the performance of the communication system due to interference.

The object is according to a first aspect of the invention achieved by a method in a first base station serving a first cell having a first coverage area at least partly overlapping with a second coverage area of a second cell served by a second base station. The first base station operates within a first transmission power range and the second base station operates within a second transmission power range, the first transmission power range having transmission power levels being higher than transmission power levels of the second transmission power range. The method comprises the steps of: determining radio link quality of a user equipment connected to the first base station and being located in an adjustable extended coverage range of the second base station; requesting from the second base station interference related measurements for unused physical channels or for physical channels at least partially overlapping with physical channels used by the user equipment connected to the first base station and having the radio link quality falling below a threshold value thus indicating poor radio link quality to the first base station; and deciding for the user equipment connected to the first base station, based on the interference related measurements, if a handover to the second base station should be performed.

By means of the invention radio resources are utilized more efficiently in the communication system compared to prior art methods, wherein all users satisfying a geometry criterion are handed over from one base station to another. The invention provides a method for selecting which user to hand over, which provides gains both to the overall system performance as well as to the individual users in question. The users are thus individually selected for handover, which could entail adjusting the extended coverage range of the second base station, so that this particular user, although not being in the conventional extended range, would fall within the adjusted extended coverage range and therefore be subject to handover evaluation. The invention provides an improved way of handing over user equipment compared to prior art, wherein all users satisfying a geometry criterion are handed over.

In an embodiment, the user equipment is determined to be located in the adjustable extended coverage range of the second base station by determining a ratio of reference signal received power measurement of the first base station and reference signal received power measurement of the second base station being higher than a first threshold or by determining the absolute value of the reference signal received power at the second base station to be above a threshold value.

In an embodiment, the step of deciding for the user equipment connected to the first base station if a handover to the second base station is to be performed is based on one or more of: the interference related measurements, amount of data for transmission to or from the user equipment connected to the first base station, on the overall communication loads of the first base station and the second base station, interference created to further neighboring base station. Users having significant amount of traffic are moved from the base station with higher transmission power to the base station with lower transmission power, offloading the base station having higher transmission power, which is beneficial for the user as well as for the communication system.

In an embodiment, the radio link quality comprises one of: downlink channel quality indicator, downlink channel state information, or number of received negative acknowledgments.

In the above embodiment, the step of deciding for the user equipment connected to the first base station if a handover to the second base station should be performed comprises the sub-steps of: determining whether the downlink interference related measurements for the physical channel exceeds a set threshold level; and if so, determining whether the amount of data waiting for transmission in the downlink for the user equipment is above a set threshold; and if so handing over the user equipment connected to the first base station to the second base station.

In an embodiment, the radio link quality comprises one of: sounding reference signal, Signal to Interference-plus-Noise Ratio or number of transmitted negative acknowledgments.

In the above embodiment, the step of deciding for the user equipment connected to the first base station if a handover to the second base station should be performed comprises the sub-steps of: determining whether the uplink interference related measurements for the physical channel exceeds a set threshold level; and if so determining whether the amount of data waiting for transmission in the uplink from the user equipment connected to the first base station is above a set threshold; and if so handing over the user equipment connected to the first base station to the second base station.

In an embodiment, the adjustable extended coverage range of the second base station comprises a range of the second coverage area extended by using cell specific cell selection offsets or the coverage area of the second cell or the range determined by the reference signal received power being above a set threshold value, the range determined by lowest path loss or the range determined by best uplink cell selection.

In an embodiment, the coverage area of the first base station comprises the coverage area of one or more coverage areas of one or more distributed antenna controlled by the first base station.

The object is according to a second aspect of the invention achieved by a first base station serving a first cell having a first coverage area at least partly overlapping with a second coverage area of a second cell served by a second base station. The first base station operates within a first transmission power range and the second base station operating within a second transmission power range, the first transmission power range having transmission power levels being higher than transmission power levels of the second transmission power range. The first base station comprises a controller arranged to: determine radio link quality of a user equipment connected to the first base station and being located in an adjustable extended coverage range of the second base station; request from the second base station interference related measurements for unused physical channels or for physical channels at least partially overlapping with physical channels used by the user equipment connected to the first base station and having the radio link quality falling below a threshold value thus indicating poor radio link quality to the first base station; and decide for the user equipment connected to the first base station, based on the interference related measurements, if a handover to the second base station should be performed.

The object is according to a third aspect of the invention achieved by a computer program for a first base station serving a first cell having a first coverage area at least partly overlapping with a second coverage area of a second cell served by a second base station. The first base station operates within a first transmission power range and the second base station operates within a second transmission power range, the first transmission power range having transmission power levels being higher than transmission power levels of the second transmission power range. The computer program comprises computer program code, which, when run on the first base station, causes the first base station to perform the steps of: determining radio link quality of a user equipment connected to the first base station and being located in an adjustable extended coverage range of the second base station; requesting from the second base station interference related measurements for unused physical channels or for physical channels at least partially overlapping with physical channels used by the user equipment connected to the first base station and having the radio link quality falling below a threshold value thus indicating poor radio link quality to the first base station; and deciding for the user equipment connected to the first base station, based on the interference related measurements, if a handover to the second base station should be performed.

The object is according to a fourth aspect of the invention achieved by a method in a second base station serving a second cell having a second coverage area at least partly overlapping with a first coverage area of a first cell served by a first base station. The first base station operates within a first transmission power range and the second base station operates within a second transmission power range, the first transmission power range having transmission power levels being higher than power levels of the second transmission power range. The method comprises the steps of: determining a radio link quality for user equipment connected to the second base station and being located in an adjustable extended coverage range of the second base station; determining an interference or traffic related parameter for user equipment connected to the second base station and having the radio link quality falling below a threshold value thus indicating poor radio link quality to the second base station; and deciding for the user equipment connected to the second base station, based on the interference or traffic related parameter, if a handover to the first base station should be performed. Users being connected to a base station having a low transmission power and not fulfilling certain conditions in terms of radio link quality can be moved to a base station with higher transmission power.

In an embodiment, the step of determining the traffic related parameter comprises requesting from the first base station traffic load parameters thereof, and wherein the user equipment is handed over to the first base station if the traffic load parameter of the first base station is below a set threshold value.

In an embodiment, the traffic related parameter comprises amount of data to be sent to or from the user equipment, and wherein the user equipment is handed over to the first base station if the amount of data is below a threshold value.

In an embodiment, the step of determining the interference related parameter comprises determining, based on information exchanged between the first and the second base stations that the user equipment creates cell interference, and wherein the user equipment is handed over to the first base station if the created cell interference is above a set threshold value.

In an embodiment, the radio link quality comprises one of: downlink channel quality indicator, downlink channel state information, number of received negative acknowledgments, sounding reference signal, Signal to Interference-plus-Noise Ratio or number of transmitted negative acknowledgments.

In an embodiment, the adjustable extended coverage range comprises a range of the second coverage area extended by using cell specific cell selection offsets or the coverage area of the second cell or the range determined by the reference signal received power being above a set threshold value.

In an embodiment, the coverage area of the second base station comprises the coverage area of one or more coverage areas of one or more distributed antenna controlled by the second base station.

The object is according to a fifth aspect of the invention achieved by computer program for a second base station serving a second cell having a second coverage area at least partly overlapping with a first coverage area of a first cell served by a second base station. The first base station operates within a first transmission power range and the second base station operates within a second transmission power range, the first transmission power range having transmission power levels being higher than transmission power levels of the second transmission power range, the computer program comprising computer program code, which, when run on the second base station, causes the second base station to perform the steps of: determine a radio link quality for user equipment connected to the second base station and being located at an adjustable extended coverage range of the second base station; determine an interference or traffic related parameter for user equipment connected to the second base station and having the radio link quality falling below a threshold value; and decide for the user equipment connected to the second base station, based on the interference or traffic related parameter, if a handover to the first base station should be performed.

The object is according to a sixth aspect of the invention achieved by second base station serving a second cell having a second coverage area at least partly overlapping with a first coverage area of a first cell served by a first base station. The first base station operates within a first transmission power range and the second base station operates within a second transmission power range, the first transmission power range having transmission power levels being higher than transmission power levels of the second transmission power range. The second base station comprises a controller arranged to: determine a radio link quality for user equipment connected to the second base station and being located at an adjustable extended coverage range of the second base station; determine an interference or traffic related parameter for user equipment connected to the second base station and having the radio link quality falling below a threshold value; and decide for the user equipment connected to the second base station, based on the interference or traffic related parameter, if a handover to the first base station should be performed.

Further features and advantages of the invention will become clear upon reading the following description and the accompanying drawings.

DETAILED DESCRIPTION OF EMBODIMENTS

Figure 1:
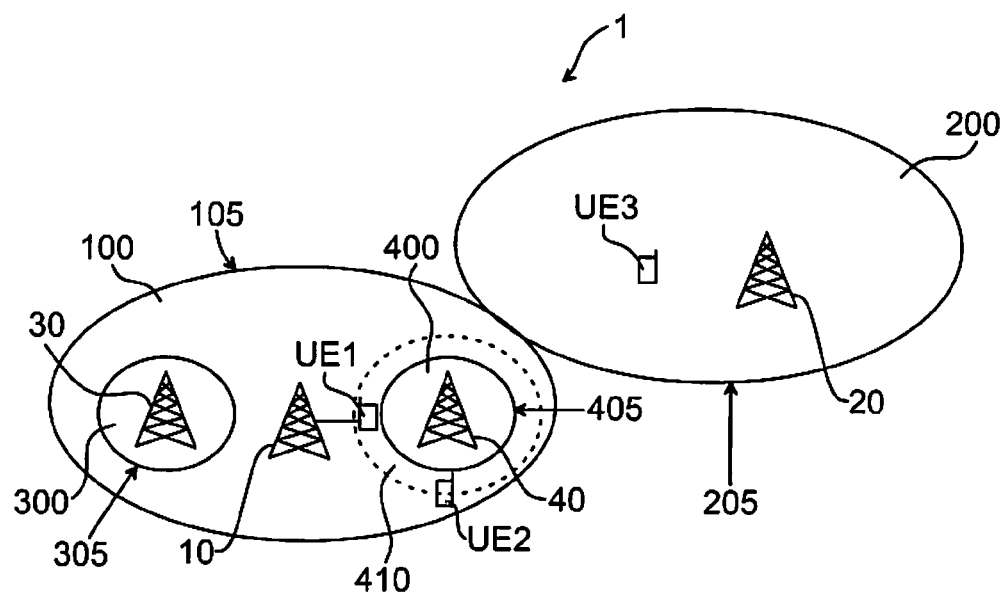
FIG. 1 illustrates schematically an environment in which embodiments of the invention may be implemented.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Same reference numerals are used for referring to like elements throughout the description.

Briefly, in accordance with aspects of the invention, users are individually evaluated for handover by determining interference levels on communication resources relevant for the users. The users that are subject to such evaluation are those being within an adjustable extended coverage range of a target base station to which they may be handed over and for which the radio link quality to the serving base station fulfills certain criterion. Users are then individually selected for handover if this would improve the overall performance of the communication system, for example in terms of reduced interference and overall load of the base stations.

The present invention is implemented in a communication system having base stations using different power levels, for example a heterogeneous cellular network (HetNets), comprising cells of different sizes and/or overlaid cells having within their coverage area a number of underlaid cells.

FIG. 1 illustrates such a communication system 1 comprising at least a first base station 10 and a second base station 40. The first base station serves a first cell 105 having a first coverage area 100. Similarly, the second base station 40 serves a second cell 205 having a second coverage area 200. It is noted that the total coverage area of e.g. the first base station 10 may comprise the coverage area surrounding the base station 10, as illustrated in FIG. 1, and/or comprise the coverage area(s) of one or more distributed antennas that are controlled by the first base station 10. Such distributed antennas, also denoted remote antennas, do no need to have coverage areas geographically overlapping each other or being next to each other, they are only controlled by the same base station and therefore included in the coverage area of the base station. The communication system 1 typically comprises yet additional base stations 20, 30 serving respective cells 205, 305 having respective coverage areas 200, 300. Although not illustrated in the figures, it is noted that one base station may serve several cells having non-overlapping coverage areas.

The first base station 10 may for example be a macro base station and the second base station 40 may for example be a pico base station. In the following such heterogeneous network is used as an example for describing embodiments of the invention, and the first base station 10 is exemplified by and denoted macro base station 10. The second base station 40 is exemplified by and denoted pico base station 40. The transmission power level used by the macro base station 10 is higher than the transmission power level used by the pico base station 40, which typically is a low power node. In particular, although a transmission power range within which the macro base station 10 transmits may be overlapping with a transmission power range within which the pico base station 40 transmits, the maximum transmission power transmitted by the macro base station 10 is higher than the maximum transmission power transmitted by the pico base station 40. It is noted that the respective transmission power ranges of the macro base station 10 and the pico base station 40 can be non-overlapping.

The communication system 1 is utilized by a number of wireless user equipment UE1, UE2, UE3 being served by a suitable base station 10, 20, 30, 40 in dependence on their location.

Figure 2:
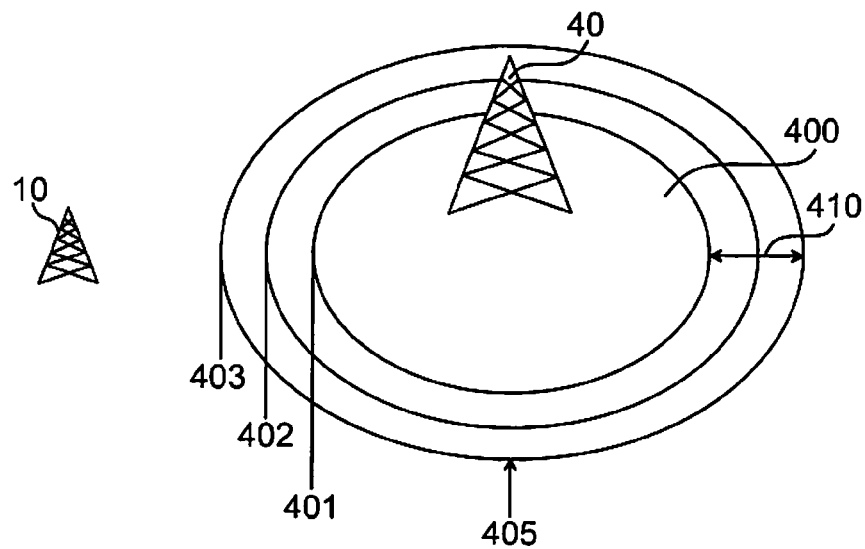
FIG. 2 illustrates extended ranges of a base station of FIG. 1.

FIG. 2 illustrates the pico base station 40 of FIG. 1, with the coverage area 400 that can be adjusted so as to include an adjustable extended coverage range 410. Within the technical field of the invention, Cell Range Expansion or Cell Range Extension (CRE), an "extended range" of a base station or equivalently "extended coverage area" of the cell controlled by the base station is meant to indicate that a cell coverage area served by the particular base station can be increased. It is known to have a cell specific offset, whereby reference signal received power (RSRP) level of a user equipment at which handover is performed is adjusted by an offset so that a handover decision is biased, whereby the handover to the particular base station is performed earlier than would otherwise be the case. In FIG. 2, a first cell border 401 illustrates the ordinary reference signal received power border, i.e. a signal strength based handover, at which border a handover to the pico base station is normally performed, i.e. when the RSRP measurement for a UE is higher than for the serving base station. A second cell border 402 illustrates an extended range, i.e. RSRP border+a first offset, e.g. down link received signal strength cell border. A third cell border 403 illustrates another extended range, i.e. RSRP border+second offset, e.g. uplink path loss base cell border. The second border 402 could for example be defined by RSRP+3 dB and the third border 403 could for example be defined by RSRP 9 dB compensating e.g. for a 9 dB power difference between a high power node (e.g. operating at 40 W, 46 dBm) and a low power node (e.g. operating at 5 W, 37 DBm). The adjustable extended coverage range 410, i.e. the user equipment individual extended coverage range, may thus comprise, although not being limited to, the area between the best downlink link cell selection (RSRP selection) and the best uplink cell selection (path loss selection). It is noted that the adjustable extended coverage range 410 may also be distinguished without use of any offset. The transmission power from both base stations 10, 40 involved are known also by the UE1, which is thus enabled to calculate path loss as transmission power—RSRP.

A UE1 connected to the macro base station 10 and being located in the adjustable extended coverage range 410 of the pico base station 40 is individually selected whether to be connected to the macro base station 10 or to the pico base station 40. As an example, this selection can be made on the basis of the uplink interference that the UE1 is creating to the pico cell 400 and amount of uplink and downlink data in UE buffers. The uplink and downlink radio link quality measures are also taken into account, such as RSRP which is the case in known range extension. How to select which base station should serve the UE1 will now be described more in detail.

The user equipment UE1, UE2, UE3 are thus individually evaluated for range extension. The UEs are individually evaluated from a radio efficiency perspective, taking into account traffic, uplink interference to the pico base station 40, downlink caused interference, radio link quality, the UE individual bitrate and/or the load sharing between the macro base station 10 and the pico base station 40 as well as uplink interference to the closest base station.

The traffic estimation for UEs can be based on buffer sizes. UEs with large amount of data in uplink buffers and small amount of data in downlink buffers are rather allocated to the pico base station 40 than UEs with the buffer sizes which indicate that the UE has mainly downlink traffic. In particular, for the UE having much uplink data to send it is more beneficial to be connected to the pico base station since the uplink pathloss is smaller to the pico base station than to the macro base station.

Traffic estimation per cell, or equivalently load per cell can be based on the sum of buffer sizes per UEs or on the basis of the sum of UEs supporting a given service, i.e. the number of users supporting VoIP or streaming services.

The uplink interference can be measured with received signal strength indication (RSSI). It can alternatively be predicted based on RSRP measurement in combination with the above described traffic information. The UEs causing most interference towards the pico cell 405 shall primarily be connected to the pico base station 40. In similar way, UEs causing most interference to the pico cell and to the closest neighbor third cell should be connected to the pico station, where they are typically expected to transmit with lower power, than when connected to macro base stations, and hence they are expected to create less other cell interference to the closest neighbor cell.

The downlink caused interference can be predicted based on cell transmission power and overall traffic or load. A UE may be connected to the pico base station 40 even though it has significant amount of downlink data to receive since the overall network performance is improved by using the pico base station 40 causing less downlink interference.

The radio link quality may be determined by RSRP measurements which is also the basis for the known prior art cell range extension. However, also channel quality indicator/channel state information (CQI/CSI) and HARQ NACK-rate can be used including indication of uplink and downlink interference. With radio link quality a refined selection within the adjustable extended coverage range 410 can be done. For example, a UE close to the macro cell 105 and path loss selection border 403 should more likely be connected to the macro base station 10 than a UE close to the pico cell 405 and RSRP selection border 401 (given the same traffic amount situation).

Also the load sharing between the macro base station 10 and the pico base station 40 can be taken into account with the objective to improve user experienced quality. If the macro base station 10 is more loaded than the pico base station 40, then the pico base station 10 is preferably selected for service and thresholds for UEs cell selection are adjusted accordingly.

Figure 3:
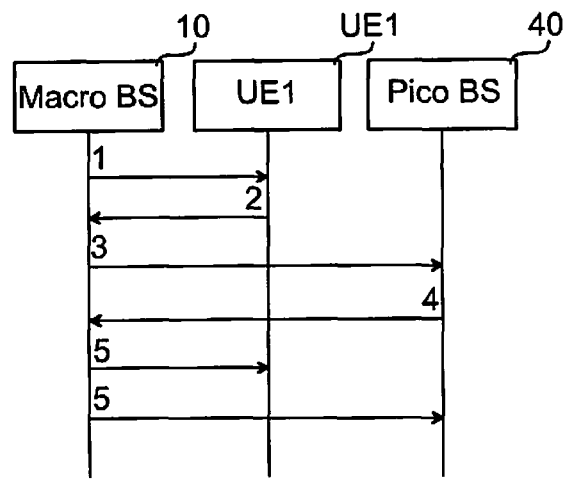
FIG. 3 is a sequence diagram illustrating information exchange between base stations for enabling user equipment individual range extension.

FIG. 3 is a sequence diagram illustrating information exchange between the base stations 10, 40 for enabling user equipment individual range extension. The serving macro base station 10 signals (arrow 1) to the user equipment UE1, RSRP reporting criteria over the PDSCH (Physical Downlink Shared Channel). The UE1 experiencing a certain geometry g towards the pico base station 40 gives an indication that it is located close to the pico base station 40. For example, g may be defined as $$g = \frac{RSRP_{serving}}{RSRP_{neighbor\_pico}} \quad (1)$$

A threshold g_threshold for determining that the UE1 is located within the adjustable extended coverage range 410 is included in the RSRP reporting criteria. The g_threshold may for example be:

$$g \leq g\_threshold = \frac{RSRP_{serving}}{RSRP_{neighbor\_pico}} \quad (2)$$

The macro base station 10 receives (arrow 2), overRRC signaling on Physical Uplink Shared Channel (PUSCH), from the UE1 the RSRP received from the serving base station and RSRP from the neighbor base station enabling calculation of a value of g, cell identity identifying if the neighbor is a low power node, and further interference (RSSI). Traffic indicating data is received over Media Access Control (MAC) protocol on a PUSCH. Channel Quality Indication (CQI) is included in the Channel State Information (CSI) report received over Radio Link Control (RLC) protocol on either PUSCH or Physical Uplink Control Channel (PUCCH). ACK and NACKs are received over the Hybrid Automatic ReQuest (HARQ) protocol on PUSCH or PUCCH enabling collecting statistics on number of acknowledgments (ACK) or negative acknowledgments (NACKs), for example fulfilling:

$$CQI \leq CQI_{threshold}, \quad (3)$$

or $$Number\_NACKs \geq NACK_{Threshold} \quad (4)$$

The macro base station 10 requests (arrow 3) from the pico base station 40 link quality and interference related measurements for user equipment on same (or partly same) physical channels, e.g. physical resource blocks (PRB), as used by the user equipment UE1 that is evaluated for pico cell range extension. The macro base station 20 receives (arrow 4) from the pico base station 40 the requested measurements, i.e. measurement reports for user equipment on e.g. at least partially same physical channels as used by the UE1 and having e.g. a certain RSSI value.

The macro base station 10 then signals (arrows 5) to the pico base station 40 and to the UE1 to perform a handover.

Figure 4:
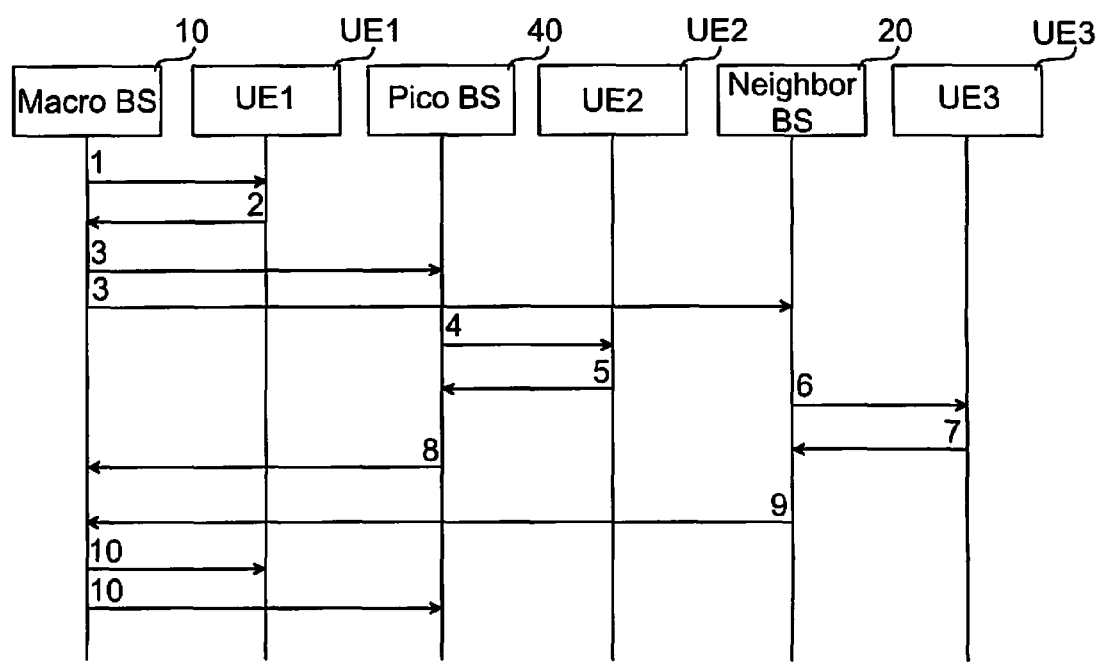
FIG. 4 is another sequence diagram illustrating information exchange between base stations for enabling user equipment individual range extension.

FIG. 4 illustrates another sequence diagram for information exchange for performing user equipment individual range extension. As in the sequence diagram of FIG. 3, the serving macro base station 10 signals (arrow 1) to the user equipment UE1, RSRP reporting criteria over the PDSCH. Also in correspondence with FIG. 3, the macro base station (40) receives (arrow 2), from the UE1, RSRP received from the serving base station and RSRP from neighbor base stations.

The macro base station 10 requests (arrows 3) from the pico base station 40 and the closest neighbor base station(s) (e.g. macro base station 20) link quality and interference related measurements for users on same (or partly same) physical channels as used by the user UE1 that is evaluated for individual pico cell range extension.

The pico base station 40 requests and receives (arrows 4 and 5, respectively) interference reports from user equipment UE2.

Likewise, the neighbor base station 20 requests and receives (arrows 6 and 7) interference reports from user equipment UE3.

The macro base station 10 receives (arrows 8 and 9) from the pico base station 40 and the neighbor base station 20 the requested measurements.

The macro base station 10 then signals (arrows 10) to the pico base station 40 and the UE1 to perform a handover if determined to improve the interference situation.

Figure 5:
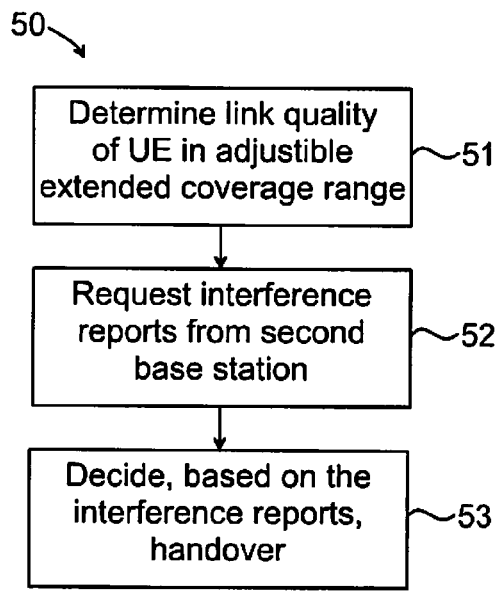
FIG. 5 is a flow chart over steps of a method in a first base station.

FIG. 5 illustrates a flow chart over steps of a method in the macro base station 10 for handling handovers to the pico base station 40. The method 50 comprises the first step of determining 51 radio link quality of the user equipment UE1 connected to the macro base station 10 and being located in the adjustable extended coverage range 410 of the pico base station 40.

The method 50 comprises the second step of requesting 52 from the pico base station 40 interference related measurements for unused physical channels or for physical channels at least partially overlapping with physical channels used by the UE1 connected to the macro base station 10 and having the radio link quality falling below a threshold value thus indicating poor radio link quality to the macro base station 10.

The method 50 comprises the third step of deciding 53 for the user equipment UE1 connected to the macro base station 10, based on the interference related measurements, if a handover to the pico base station 40 should be performed. The decision may for example be based on the interference related measurements, amount of data for transmission to or from the user equipment UE1 connected to the macro base station 10, on the overall communication loads of the macro base station 10 and the pico base station 40, interference created to further neighboring base station 20, 30.

The user equipment UE1 can be determined to be located in the adjustable extended coverage range 410 of the pico base station 40 in different ways. For example, a ratio of reference signal received power measurement of the macro base station 10 and reference signal received power measurement of the pico base station 40 may be determined to be higher than a first threshold g_threshold (earlier equation (2)) or by determining the absolute value of the reference signal received power at the pico base station 40 to be above a threshold value. The UE may also be determined to be in the adjustable extended coverage range 410 of the pico base station 40 when determining it to be between the highest RSRP selection and best path loss selection. The transmission power of the base station is signaled over the BCH enabling path loss calculation to each node.

The radio link quality can also be determined in different ways. It may for example be related to downlink quality and comprise downlink channel quality indicator, downlink channel state information, or number of received negative acknowledgments.

Figure 6:
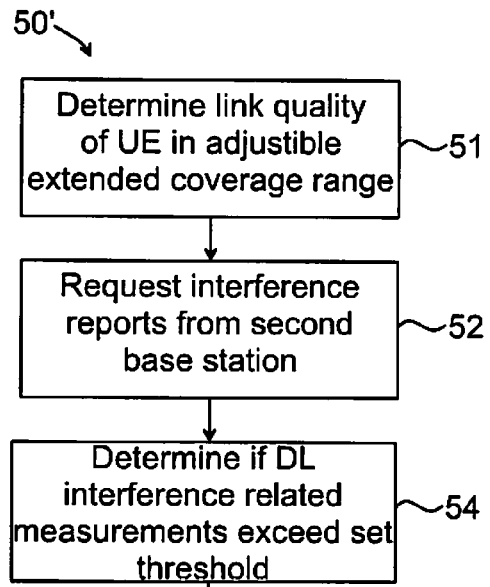
FIG. 6 illustrates an embodiment of the method of FIG. 5.

In a variation of the embodiment of FIG. 5, a method 50' is provided having steps 51 and 52 identical with the method 50 of FIG. 6, but step 53 is performed as follows. In this embodiment based on downlink quality and illustrated in FIG. 6, the step of deciding 53 for the user equipment UE1 connected to the macro base station 10 if a handover to the pico base station 40 should be performed comprises three sub-steps. Firstly, in sub-step 54, it is determined whether the downlink interference related measurements (obtained from the pico base station 40 in step 52) for the physical channel exceeds a set threshold level. If this is the case, then, in sub-step 55, it is determined whether the amount of data waiting for transmission in the downlink for the user equipment UE1 is above a set threshold. If this is the case, then the user equipment UE1 connected to the macro base station 10 is handed over, in sub-step 56, to the pico base station 40.

In other embodiments, the radio link quality is related to uplink quality, and may comprise one of: sounding reference signal, Signal to Interference-plus-Noise Ratio or number of transmitted negative acknowledgments.

Figure 7:
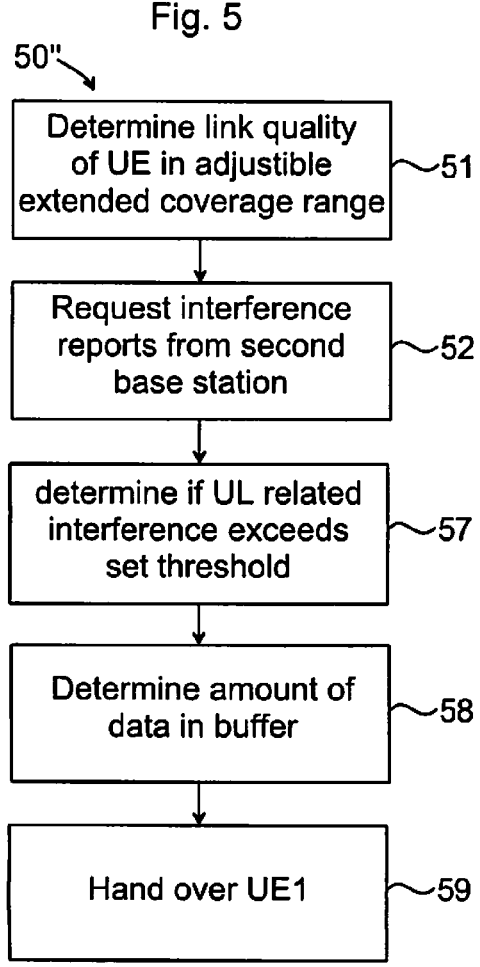
FIG. 7 illustrates another embodiment of the method of FIG. 5.

In an variation of the embodiment of FIG. 5, a method 50" is provided having steps 51 and 52 identical with the method 50 of FIG. 5, but step 53 is performed as follows. In this embodiment, based on uplink quality and illustrated in FIG. 7, the step of deciding 53 for the user equipment UE1 connected to the macro base station 10 if a handover to the pico base station 40 should be performed comprises three sub-steps. In a first sub-step it is determined 57 whether the uplink interference related measurements for the physical channel exceeds a set threshold level. If this is the case, then, in sub-step 58, it is determined whether the amount of data waiting for transmission in the uplink from the user equipment UE1 is above a set threshold. If this is the case, then the user equipment UE1 connected to the macro base station 10 is handed over, in sub-step 59, to the pico base station 40.

The steps and features of the above described methods 50, 50', 50" may be combined in different ways, an example of which is described next. User equipment connected to the macro base station 10 and experiencing a certain geometry to the neighbor pico cells, based on e.g. RSRP (or RSRQ) measurements done on the serving and neighbor pico base stations indicate that those user equipment are located close to pico base stations, are traced (as being potential candidates for handover) in terms of radio link quality. For these user equipment, the CQI from the CSI reports are gathered at the serving macro base station 10. For each user equipment UE1 with a certain geometry g it is checked if the reported CQI from the CSI is below a given threshold CQIthreshold, or if the number of NACKs is above a number, indicating thus that the downlink radio link quality is not good.

For those user equipment with a downlink radio link quality below the threshold and located within this adjustable extended range of pico or small cells, the serving base station requests the neighbor pico cells and macro cells to get interference measurements or CQI from the CSI from user equipment in these neighbor cells that are using the same or partially same physical channels as the ones used by the user equipment UE1 in question. The interference measurements could alternatively be done on unused physical channels.

In case neighbor pico base station 40 reports CQI/CSI and RSSI levels on the physical channels (e.g. PRBs) used by the UEs in question or its NACK rate, that indicate high other cell downlink interference, then the macro base station 10 checks the amount of data waiting for transmission in its buffers/scheduling queues for user equipment UE1.

In case the amount of data waiting for downlink (DL) transmission for user equipment UE1 is above a certain number, indicating that the gain by offloading the macro base station 10 is going to be substantial, then the pico cell 405, checks its overall load.

In case the macro cell 105 is loaded above a given load threshold level, then, this is an indication that macro layer offloading can be useful. As a next step, it is checked if the pico cell 405 is loaded below a given pico cell load threshold, i.e. if the pico cell 405 can accommodate the load transferred from the macro cell 105 due to these designated user equipment. If this is the case, then the user equipment UE1 is handed over to the pico cell 405.

The user equipment connected to the macro base station 10 and being within the adjustable extended coverage range of the pico base station 40 may be traced at the serving macro base station in terms of reported SRS, or received SINR, or ACKs.

In case any of these traced measurements indicates that the uplink link quality is below a quality threshold, hence indicating that the uplink radio link is not good, then the macro base station 10 asks the pico base station 40 to report their uplink interference levels on the physical channels used by the user equipment in question. In case the report interference levels are above a given threshold level, indicating thus that the designated user equipment create significant other cell interference in the uplink, then macro base station 10 asks the user equipment fulfilling all the above criteria to report the data in their buffers waiting for uplink transmission. For those user equipment, for which the data buffers sizes are larger than a size threshold, it is decided to hand them over to the pico base station 40.

Figure 8:
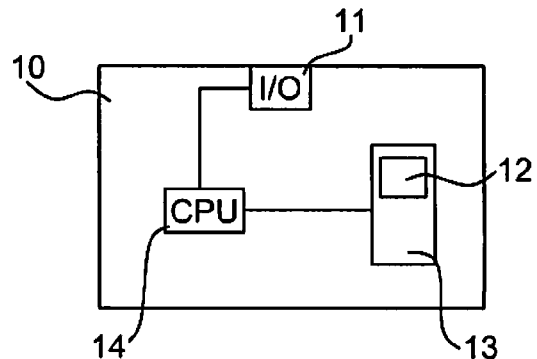
FIG. 8 illustrates means in the first base station for implementing methods of FIGS. 5-7.

FIG. 8 illustrates the macro base station 10 and in particular means for implementing the described methods. The macro base station 10 comprises a processor 14, e.g. a central processing unit, microcontroller, digital signal processor (DSP), etc., capable of executing software instructions stored in a computer program product 12 e.g. in the form of a memory. The processor 14 is connected to an input device 11 that receives inputs from user equipment UE1, UE2, typically via some other device, e.g. a transceivers, of the base station 10. The processor 14 further receives, by means of the input device 11 or some other input means, input from other base stations 20, 30, 40, e.g. backhaul X2 communication. It is noted that although only one processor 14 is illustrated in FIG. 8, the implementation may comprise distributed hardware so that several CPUs are used rather than one when running the software. Likewise, although only one input device 11 is illustrated, there may be several input devices, e.g. one input device handling inputs from base stations and another input device handling inputs from user equipment.

The described methods and algorithms or parts thereof for use in handling handover may be implemented e.g. by software and/or application specific integrated circuits in the processor 14. To this end, the base station may further comprise a computer program 12 stored on a computer program product 13.

With reference still to FIG. 8, the invention also encompasses such computer program 12 for handling handovers. The computer program 12 comprises computer program code which when run on the macro base station 10, and in particular the processor 14 thereof, causes the macro base station 10 to perform the methods as described.

A computer program product 13 is also provided comprising the computer program 12 and computer readable means on which the computer program 12 is stored. The computer program product 13 can be any combination of read and write memory (RAM) or read only memory (ROM). The computer program product 13 may also comprise persistent storage, which, for example can be any single one or combination of magnetic memory, optical memory, or solid state memory.

Figure 9:
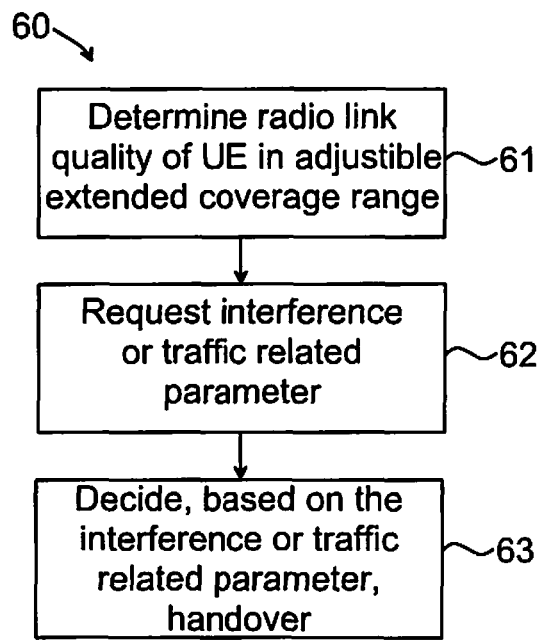
FIG. 9 is a flow chart over steps of a method in a second base station.

Methods in the macro base station 10 for handing over a user equipment from the macro base station 10 to the pico base station 40 have been described. However, there are cases when handing over the user equipment to the macro base station 10 would be beneficial. The invention also encompasses such methods. In particular, FIG. 9 illustrates a flow chart over steps of a method 60 in a pico base station 40 for handing a user equipment back to the macro base station 10. The method 60 comprises the first step of determining 61 a radio link quality for user equipment UE2 connected to the pico base station 40 and being located in the adjustable extended coverage range of the pico base station 40.

The method 60 comprises the second step of determining 62 an interference or traffic related parameter for user equipment UE2 connected to the pico base station 40 and having the radio link quality falling below a threshold value thus indicating poor radio link quality to the pico base station 40. This step can be implemented by predicting a potentially caused interference if the UE would be handed over to the macro base station 10. Such potentially caused interference may be predicted based on RSRP measurements.

The method 60 comprises the third step of deciding 63 for the user equipment UE2 connected to the pico base station 40, based on the interference or traffic related parameter, if a handover to the macro base station 10 should be performed.

It is noted that the pico base station 40 could, but need not, request interference related measurements from the macro base station 10 before deciding whether to hand over the UE2 back to the macro base station 10. The requirements for handing UEs back to macro base station 10 are preferably more relaxed. The handing back being more relaxed can be justified by the UE located in the adjustable extended coverage range 410 of the pico base station 40 probably does not generate high interference to neighbor base stations neither in uplink, as the UE is located closer to the pico base station and uses lower transmission power, nor in the downlink, for the same reasons and further since the macro base station 10 transmits with higher power.

The step of determining the traffic related parameter may comprise requesting from the macro base station 10 traffic load parameters thereof, and the user equipment UE2 is handed over to the macro base station 10 if its traffic load parameter is below a set threshold value.

The traffic related parameter may comprise an amount of data to be sent to or from the user equipment UE2 from/to the serving base station, and the user equipment UE2 may then be handed over to the macro base station 10 if the amount of data is below a threshold value.

The step of determining the interference related parameter may comprise determining, based on information exchanged between the macro and the pico base stations 10, 40, that the user equipment UE2 creates cell interference, and the user equipment UE2 is handed over to the macro base station 10 if the created cell interference is above a set threshold value.

The radio link quality may for example comprise downlink channel quality indicator, downlink channel state information, number of received negative acknowledgments, sounding reference signal, Signal to Interference-plus-Noise Ratio or number of transmitted negative acknowledgments.

The steps and features of the described method 60, performed in the pico base station 40, can be combined in different ways, an example of which will be described next. User equipment connected to pico base station 40 and located at their extended range are traced by the pico base station 40 in terms of CQI/CSI, number of NACKS, in terms of other cell interference generated in the physical channels used by them and in terms of traffic load. As in accordance with already described embodiments, if the downlink radio link quality is below a quality threshold and if the transmission to these user equipment creates other cell interference in downlink above an interference threshold, then the data traffic of these user equipment is checked. If the amount of traffic waiting for DL transmission for these user equipment is below a threshold then these user equipment can be handed over back to the macro base station 10.

In another example of the method 60, performed in the pico base station 40, user equipment connected to low power nodes (not illustrated) and located within their extended range are traced by the pico base station 40 in terms of uplink radio link quality, interference created to other cells and buffers sizes.

In case the uplink radio link quality is below a quality threshold and the interference created to macro cell is above an interference threshold, then it checked if the uplink data buffers sizes are below a size threshold. If this condition is also satisfied then user equipment are handed over back to the macro base station 10.

The geometry g of the user equipment UE1, i.e. the determination of UE being within the adjustable extended coverage range, may be measured via the ratio of Reference Symbols Received Power (RSRP) to the RSRP from the pico cell, as earlier.

In the following, different features are described that can be implemented as appropriate in the various embodiments of the described methods.

The macro base station 10 broadcasts or notifies user equipment by means of dedicated signaling the geometry threshold, g_threshold, to be used when performing measurements on reference signals (RS).

When the measured geometry to given neighbor pico cells is below the geometry threshold, i.e. when equation (2) is satisfied, user equipment report this event to their serving macro base station 10. The report might contain the geometry value measured, the RSPR values of (2) and their capability to cancel interference from neighbor cells CRS.

User equipment within the adjustable extended coverage range are traced in terms of downlink performance; this is done by controlling the CQI/CSI reported by UEs satisfying condition (2), as well as controlling the number of NACKs reported by those UEs. Namely if equation (3) or $$\text{Number\_NACKs} \geq \text{NACKs}_{threshold} \quad (4)$$

is satisfied for user equipment within the adjustable extended coverage range, then it is checked, in the serving macro base station, what is the amount of other cell interference generated by these user equipment. Serving macro base station 10 requests the CQI/CSI and RSSI measurements done by user equipment in neighbor cells on the same physical channels used by those user equipment fulfilling (2) & (3) or (2) & (4). Namely, it is checked, in the serving macro base station, if $$\text{CQI\_Neighbor\_SamePBR} \leq \text{CQI\_Neighbor\_Same-} \\ \text{PRBs}_{threshold} \quad (5)$$

or $$\text{Number\_NACKs\_neighbor\_SamePBRs} \geq \text{Number\_} \\ \text{NACKsNeighbor\_SamerPBRs} \quad (6)$$

Or $$\text{RSSI\_Neighbor} \geq \text{RSSI\_Neighbor}_{threshold} \quad (7)$$

are satisfied. If one of (5)-(7) is satisfied then, it is checked, in the serving macro base station, if the amount of DL data in the buffers waiting for transmission exceeds a certain data size threshold:

$$\text{DL\_DataBuffers\_Size} \geq \text{DL\_DataBuffers\_Size}_{threshold} \quad (8)$$

The user equipment satisfying $$\{[(2)] \&\& [(3) \text{OR}(4)] \&\& [(5) \text{OR}(6) \text{OR}(7)] \&\& [(8)]\} \quad (9)$$

are handed over to the pico base station 40.

User equipment within a certain geometry g as defined earlier are traced in terms of uplink performance; this is done by controlling the uplink SRS of UEs satisfying condition (2), as well as controlling the number of NACKs detected within the macro base stations. Namely, if $$\text{SRS} \leq \text{SRS}_{Threshold} \quad (10)$$

or $$\text{Number\_NACKs} \geq \text{Number\_NACKs}_{threshold\_2} \quad (11)$$

is satisfied for user equipment within a given geometry, then it is checked, in the serving macro base station, what is the amount of other cell interference generated by these user equipment. Serving macro base station 10 requests the uplink interference levels received by neighbor cells on the same physical channels used by those user equipment fulfilling (2) & (9) or (2) & (10). Namely, it is checked, in the serving macro base station, if $$\text{SRS\_Neighbors\_Same\_physical\_channels} \geq \\ \text{SRS\_Neighbors\_Same\_physical\_} \\ \text{channels}_{threshold} \quad (12)$$

or $$\text{UL\_Intf\_Neighbors\_Same\_physical\_} \\ \text{channels} \geq \text{UL\_Intf\_Neighbors\_Same\_physical\_} \\ \text{channels}_{Threshold} \quad (13)$$

or $$\text{Number\_NACKs\_Neighbors\_Same\_physical\_} \\ \text{channels} \geq \text{Number\_NACKs\_Neighbors\_Same\_} \\ \text{physical\_channels}_{threshold\_2} \quad (14)$$

are satisfied. The above equations can be expressed with words as: if SRS from UEs at neighbor cells using similar physical channels are showing NOT good quality, or the interference these UEs at neighbor cells receive is higher than a threshold, or these same UEs at the neighbor cells report a number of NACKs higher than a threshold, this shows that UEs at neighbor cells using the same (or partly same) physical channels as the UE1 in the serving macro base station, do NOT have good channel quality, hence those UEs at neighbor cells suffer from the UE1 to be handed over to the pico, then this UE1 is handed over to the pico.

For user equipment satisfying one of (12)-(14), it is, in an embodiment, asked to report the size of data waiting for uplink transmission:

$$\text{UL\_Databuffers\_Size} \geq \text{UL\_Databuffers\_Size}_{Threshold} \quad (15)$$

for those user equipment satisfying $$\{[(2)] \&\& [(10) \text{OR}(11)] \&\& [(12) \text{OR}(13) \text{OR}(14)] \&\& \\ [(15)]\} \quad (17)$$

they are handed over to the pico base station 40.

Figure 10:
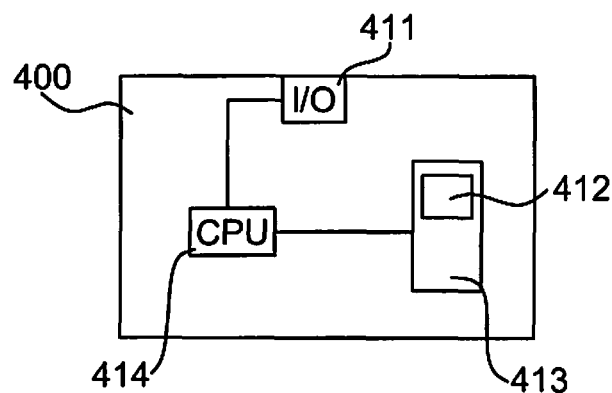
FIG. 10 illustrates means in the second base station for implementing methods of FIG. 9.

FIG. 10 illustrates the pico base station 40 and in particular means for implementing the above described methods. The pico base station 40 comprises a processor 414, e.g. a central processing unit, microcontroller, digital signal processor (DSP), etc., capable of executing software instructions stored in a computer program product 412 e.g. in the form of a memory. The processor 414 is connected to an input device 411, that receives inputs from user equipment UE1, UE2, typically via some other device, e.g. a transceivers, of the pico base station 40. The processor 414 further receives, by means of the input device 411 or some other input means, input from other base stations 20, 30, 40, e.g. backhaul X2 communication. It is noted that although only one processor 414 is illustrated in FIG. 10, the implementation may comprise distributed hardware so that several CPUs are used rather than one when running the software Likewise, although only one input device 411 is illustrated, there may be several input devices, e.g. one input device handling inputs from base stations and another input device handling inputs from user equipment. The described methods and algorithms or parts thereof for use in handling handovers may be implemented e.g. by software and/or application specific integrated circuits in the processor 414. To this end, the pico base station 40 may further comprise a computer program 412 stored on a computer program product 413.

With reference still to FIG. 10, the invention also encompasses such computer program 412 for handling handovers. The computer program 412 comprises computer program code which when run on the pico base station 40, and in particular the processor 414 thereof, causes the pico base station 40 to perform the methods as described.

A computer program product 413 is also provided comprising the computer program 412 and computer readable means on which the computer program 412 is stored. The computer program product 413 can be any combination of read and write memory (RAM) or read only memory (ROM). The computer program product 413 may also comprise persistent storage, which, for example can be any single one or combination of magnetic memory, optical memory, or solid state memory.

The described methods can be implemented in any kind of heterogeneous networks featuring open access pico base stations connected to macro base stations. It applies to any mixture of nodes with different power levels; macro base stations, micro base stations, pico base stations, indoor base stations or femto base stations. It is suitable for any network architecture with backhaul of any type and of any latency level; backhaul connecting macro base stations or backhaul connecting macro base stations and low power nodes. Hence, it is suitable for distributed architectures, as well as for centralized ones where all the information is centrally available.

The methods are also very suitable for systems featuring a centralized architecture, such as the a scenario comprising macro base stations and Radio Remote Units (RRUs) or Remote Radio Heads (RRHs). In this case the messages that are described as messages to be exchange over X2 (or S1) between macro eNBs and pico NBs in FIG. 3 & FIG. 4, are messages exchanged via the proprietary interface connecting the macro BS and the pico nodes. Hence, this method is suitable for centralized radio access network architectures, such as C-RAN, CeNB, RNC (Radio Network Controller) as well.

By this scheme radio resources are more efficiently utilized in the communication system 1, in comparison to the prior art scheme blindly handing over all user equipment satisfying the geometry criterion from macro to pico base station 40. The benefit for the overall communication system is that user equipment indeed being problematic at the macro base station 10 are more likely to be handed over to pico base station 40. In addition, user equipment having significant amount of traffic are more likely to be moved from macro base station 10 to pico base station 40, hence considerably offloading the macro base station 10. In addition, user equipment moved to pico base station 40 and not fulfilling the conditions in terms of radio link quality and traffic load, can be moved back to the macro base station 10.

The invention claimed is:

1. A method in a first base station serving a first cell having a first coverage area at least partly overlapping with a second coverage area of a second cell served by a second base station, the first base station operating within a first transmission power range and the second base station operating within a second transmission power range, the first transmission power range having transmission power levels being higher than transmission power levels of the second transmission power range, the method comprising the steps of:

determining whether a user equipment (UE1) connected to the first base station is located in an adjustable extended coverage range of the second base station; and when the user equipment (UE1) is located in the adjustable extended coverage range of the second base station, individually evaluating the user equipment (UE1) for handover to the second base station by:

determining radio link quality of a physical channel utilized by the user equipment (UE1) to connect to the first base station;

requesting and receiving from the second base station, interference related measurements for physical channels, used or unused by the second base station, that at least partially overlap with the physical channel used by the user equipment (UE1) to connect to the first base station;

detecting that the radio link quality of the physical channel used by the user equipment (UE1) to connect to the first base station has fallen below a threshold value thus indicating poor radio link quality to the first base station; and deciding for the user equipment (UE1) connected to the first base station, based on the user equipment (UE1) being located in the adjustable extended coverage range of the second base station and based on the interference related measurements received from the second base station, whether a handover to the second base station should be performed.

2. The method according to claim 1, wherein the user equipment (UE1) is determined to be located in the adjustable extended coverage range of the second base station by determining that a ratio of reference signal received power measurement of the first base station to reference signal received power measurement of the second base station is higher than a first threshold (g_threshold) or by determining that an absolute value of the reference signal received power at the second base station is above a second threshold value.

3. The method according to claim 1, wherein the step of deciding whether a handover to the second base station is to be performed is based on one or more of: the interference related measurements, amount of data for transmission to or from the user equipment (UE1) connected to the first base station, on the overall communication loads of the first base station and the second base station, and interference created to a further neighboring base station.

4. The method according to claim 1, wherein the radio link quality comprises one of: sounding reference signal, Signal to Interference-plus-Noise Ratio or number of transmitted negative acknowledgments.

5. The method according to claim 1, wherein the coverage area of the first base station comprises the coverage area of one or more coverage areas of one or more distributed antenna controlled by the first base station.

6. A first base station serving a first cell having a first coverage area at least partly overlapping with a second coverage area of a second cell served by a second base station, the first base station operating within a first transmission power range and the second base station operating within a second transmission power range, the first transmission power range having transmission power levels being higher than transmission power levels of the second transmission power range, the first base station comprising:

a transceiver; and a control circuit configured to:
- determine whether a user equipment (UE1) connected to the first base station is located in an adjustable extended coverage range of the second base station; and
- when the user equipment (UE1) is located in the adjustable extended coverage range of the second base station, individually evaluate the user equipment (UE1) for handover to the second base station by:
  - determining, based on an input from the transceiver, radio link quality of a physical channel utilized by the user equipment (UE1) to connect to the first base station;
  - requesting and receiving from the second base station, interference related measurements for physical channels, used or unused by the second base station, that at least partially overlap with the physical channel used by the user equipment (UE1) to connect to the first base station;
  - detecting that the radio link quality of the physical channel used by the user equipment (UE1) to connect to the first base station has fallen below a threshold value thus indicating poor radio link quality to the first base station; and
  - deciding for the user equipment (UE1) connected to the first base station, based on the user equipment (UE1) being located in the adjustable extended coverage range of the second base station and based on the interference related measurements received from the second base station, whether a handover to the second base station should be performed.

7. A computer program product comprising a computer program stored on a non-transitory medium in a first base station serving a first cell having a first coverage area at least partly overlapping with a second coverage area of a second cell served by a second base station, the first base station operating within a first transmission power range and the second base station operating within a second transmission power range, the first transmission power range having transmission power levels being higher than transmission power levels of the second transmission power range, the computer program comprising computer program code, which, when run on a processing circuit in the first base station, causes the first base station to perform the steps of:
- determining whether a user equipment (UE1) connected to the first base station is located in an adjustable extended coverage range of the second base station; and
- when the user equipment (UE1) is located in the adjustable extended coverage range of the second base station, individually evaluating the user equipment (UE1) for handover to the second base station by:
  - determining radio link quality of a physical channel utilized by the user equipment (UE1) to connect to the first base station;
  - requesting and receiving from the second base station, interference related measurements for physical channels, used or unused by the second base station, that at least partially overlap with the physical channel used by the user equipment (UE1) to connect to the first base station;
  - detecting that the radio link quality of the physical channel used by the user equipment (UE1) to connect to the first base station has fallen below a threshold value thus indicating poor radio link quality to the first base station; and
  - deciding for the user equipment (UE1) connected to the first base station, based on the user equipment (UE1) being located in the adjustable extended coverage range of the second base station and based on the interference related measurements received from the second base station, whether a handover to the second base station should be performed.

8. The method according to claim 1, wherein determining whether the user equipment (UE1) connected to the first base station is located in the adjustable extended coverage range of the second base station includes:
- determining that the user equipment (UE1) is outside a conventional extended coverage range of the second base station; and
- causing the second base station to adjust the conventional extended coverage range of the second base station so that the user equipment (UE1) is located in the adjustable extended coverage range of the second base station.

9. The first base station according to claim 6, wherein the control circuit is configured to determine whether the user equipment (UE1) connected to the first base station is located in the adjustable extended coverage range of the second base station by:
- determining that the user equipment (UE1) is outside a conventional extended coverage range of the second base station; and
- causing the second base station to adjust the conventional extended coverage range of the second base station so that the user equipment (UE1) is located in the adjustable extended coverage range of the second base station.

10. The computer program product according to claim 7, wherein the processing circuit causes the first base station to determine whether the user equipment (UE1) connected to the first base station is located in the adjustable extended coverage range of the second base station by:
- determining that the user equipment (UE1) is outside a conventional extended coverage range of the second base station; and
- causing the second base station to adjust the conventional extended coverage range of the second base station so that the user equipment (UE1) is located in the adjustable extended coverage range of the second base station.

* * * * *